UNITED STATES PATENT OFFICE 2,211,280

WATER-SOLUBLE NITROGENOUS COMPOUNDS AND A PROCESS FOR THEIR MANUFACTURE

Henry Martin, Basel, and Hans Heinrich Zaeslin, Riehen, near Basel, Switzerland, assignors to J. R. Geigy A. G., Basel, Switzerland No Drawing. Application June 28, 1938, Serial No. 216,344. In Switzerland July 8, 1937

12 Claims. (Cl. 260—564)

According to the present invention, new and stable water soluble compounds are made by alkylating or aralkylating amidines of the general formula:

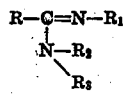

wherein R means a substituted or unsubstituted, aliphatic, araliphatic, aromatic or hydroaromatic radical, $R_1$ means the same radicals as R, also a heterocyclic radical; the aliphatic and araliphatic radicals R and $R_1$ may also contain a hetero-atom or a hetero-atom-grouping, such as —S—, —O—, —NH—, and $R_2$ and $R_3$ mean hydrogen or an aliphatic, araliphatic, aromatic or hydroaromatic, substituted or unsubstituted radical; $R_2$ and $R_3$ may also belong to the same hydroaromatic ring.

By the alkylation or aralkylation particularly substituted or unsubstituted alkyl-, aralkyl- or alkylene-radicals are introduced.

The stability of the new compounds is very surprising as the alkylation products of Schiff's bases and of ketimides are for example easily decomposable, being decomposed in some cases already by moist air (see Ber. 34, 825; 54, 1722; 55, 1912).

The imide-halides are particularly suited as parent material for the production of the new compounds. Aliphatic, araliphatic, aromatic or hydroaromatic carboxylic acids, unsubstituted or substituted in any desired manner, are transformed into the amides, for which aliphatic, araliphatic, aromatic, hydroaromatic or heterocyclic primary amines, unsubstituted or substituted in any desired manner, may be used in accordance with the purpose of application of the final products. The imide-halides are made by known processes under exclusion of moisture; also imide-halides halogenated in the alkyl-, aralkyl-, and aryl-radical can be used (see Annalen der Chemie 435, 113). In an indifferent solvent the imide-halides are then decomposed to the differently substituted amidines by means of ammonia or a simple or mixed substituted (i. e. substituted by the same or different substituents) or unsubstituted primary or secondary amine (containing, linked with the carbon atoms, also hydroxy-, alkoxy-groups and/or halogen atoms) of aliphatic, araliphatic, aliphatic-araliphatic, aromatic, aliphatic-aromatic, araliphatic-aromatic, hydroaromatic, aliphatic-hydroaromatic, araliphatic-hydroaromatic or heterocyclic nature. However, the amidines may also be made by other known methods, for example by decomposition of the corresponding thio-amides or cyanides with ammonia or a primary or secondary amine; the carboxylic acid amides of secondary amines may also be transformed into amidines by first producing the keto-chloride and then decomposing the same with a primary base.

As carboxylic acids particularly tertiary carboxylic acids are suitable, such as for example benzoic acid, halogenated benzoic acids, fencholic acid, campholic acid, α-chloro-isobutyric acid, α,α-dichlorostearic acid or the like, but also other carboxylic acids such as the hexa-hydrobenzoic acid, aliphatic carboxylic acids, such as the products of saponification of the fats and oils, mono- and dichloracetic acid or the like.

As amines for the formation of amidines, primary aliphatic and aromatic amines for example are of particular importance; methylamine, ethylamine and also amines made according to Hofmann's decomposition process from amides of carboxylic acids of high molecular weight, such as palm nut oil acid, palmitic acid, stearic acid, cod liver oil acid or the like, or made with ammonia from higher alcohols produced by hydrogenation of the natural fats, oils, resins or naphthenic acids, or of the benzyl-phenols, aniline, unsymmetrical-diethyl-para-phenylenediamine or halogen substituted anilines, such as 4-chloro- or 3:4-dichloroaniline lend the particular properties to compounds made by the process of this invention. But also hydroaromatic or heterocyclic amines, such as for example cyclohexylaniline or 2-aminobenzthiazoles are of importance.

For the production of imide-halides thionyl-chloride is just as well suited as phosphorus pentahalides or phosgene; it is known that by applying the halogenating agent in excess, a further halogenation of the aliphatic and aromatic radicals may be obtained in the same reaction (see Annalen 453, 113).

For the production of amidines ammonia, particularly methyl-, ethyl- and dimethylamine are suitable, but also higher amines, such as unsymmetrical diethylethylene-diamine, piperidine or the like are of great value.

For the alkylation or aralkylation, alkylating and aralkylating agents may serve which are saturated or unsaturated, substituted or unsubstituted in any desired manner, such as methyl chloride, lauryl chloride, cetyl bromide, allyl bromide, benzyl chloride, nuclear halogenated benzyl chlorides, glycerine-chlorhydrin, dimethyl sulphate, diethyl sulphate, chloracetic ester or the like.

The parent materials for the alkylation and aralkylation, the amines of the amidine type are mostly oils which can easily be distilled in a vacuum and are insoluble or sparingly soluble in water. They can be converted into substances soluble in water by methods commonly used in the case of ammonia derivatives; with inorganic or organic acids they form salts, for example hydrochlorides, sulphates, phosphates, silicofluorides, formates and oxalates.

The new compounds are useful for various purposes. By suitable choice of the components used in their synthesis it is possible to combine particular properties in the same molecule or to render some particular action very prominent. The possibilities of influencing the properties of the final products are remarkably numerous, the amide and the acid radical being available for various substitutions. Substitution by one or more halogen atoms in the acid and amine radical, also in the aralkylating agent, for example changes the substantivity or toxicity of the compounds, whereas substitution by hydroxyl or further substitution at the nitrogen gives rise to other effects. Thus, there can be obtained for example textile assistants, such as wetting agents, agents for improving the fastness of direct dyeings towards water, agents for stripping naphthol-AS-dyeings, agents for imparting a matt appearance to regenerated cellulose or softening agents for textiles. Some of the new compounds are also very valuable as agents for combatting animal pests, such as agents for protecting plants or as moth-proofing agents. The strong bactericidal and fungicidal properties of certain of the new compounds are also of importance.

The following examples illustrate the invention, the parts being by weight, and the relationship between parts by weight and parts by volume being that between the kilo and the litre.

*Example 1*

10 parts of dimethylphenyl-benzamidine (made in known manner from benzanilide by transformation into the imide-chloride and decomposition with dimethylamine) are dissolved in 80 parts by volume of benzene, 6.2 parts of dimethyl sulphate are added and the mixture is heated for 6-8 hours at 70-80° C., whereupon the new compound has separated as an oil. The benzene layer is separated and the residue dried in a vacuum. After some time the new compound, which is clearly soluble in water, solidifies.

Instead of dimethylphenyl-benzamidine a corresponding amidine halogenated in the benzene nucleus can be used.

*Example 2*

10 parts of the amidine used in Example 1 are heated with 7 parts of benzyl chloride for 15 hours at 110-120° C. On cooling the mass solidifies. It is washed with a little ether to remove the excess of benzyl chloride. The new compound is clearly soluble in water.

Instead of benzyl chloride a benzyl halide halogenated in the nucleus can be used.

*Example 3*

12 parts of dodecyl bromide are added to 10 parts of the amidine used in Example 1 and the mixture is heated for 15 hours at 130-140° C.; on cooling the new water-soluble compound solidifies.

Instead of dodecyl bromide the corresponding quantity of pentadecyl bromide, hexadecyl bromide or octodecyl bromide may be used.

*Example 4*

11.2 parts of ethylphenyl-benzamidine (made from benzanilide by decomposing the corresponding imide-chloride with ethylamine) are dissolved in 60 parts by volume of benzene, 7 parts of dimethyl sulphate are added and the mixture is heated for some hours at 70-80° C. The methylated compound separates out and is dried after having removed the benzene layer. After some time the at first oily product solidifies.

*Example 5*

27 parts of pentadecylamine are heated with 17 parts of benzyl chloride for 20 hours at 110-120° C., whereby a strong evolution of hydrogen chloride is produced. Then 30 parts of thionyl chloride are added and the whole is heated for about 4 hours at 90-100° C. The imide-chloride formed is heated in a vacuum at 70-80° C. to remove the excess of thionyl chloride, then the residue is dissolved in 300 parts of benzene and gaseous dimethylamine is blown in at 10-20° C. until no more hydro-chloride separates out. This having been filtered, the benzene solution of the amidine is evaporated in a vacuum and finally the dimethyl-pentadecyl-benzamidine is distilled in a high vacuum: boiling point at 0.7 mm.=195 to 198° C.

(a) 12 parts of dimethyl-pentadecyl-benzamidine are heated with 4.3 parts of dimethyl sulphate for 4 hours at 70-80° C. 15 parts of a clearly water-soluble strongly foaming compound are obtained.

(b) 12 parts of the said amidine are heated for 4 hours at 70-80° C. with 5.2 parts of diethyl sulphate. Finally there remains a clearly water-soluble compound.

In the above example the pentadecylamine can be replaced by the corresponding quantity of dodecyl-, hexadecyl- or octodecyl-amine. In place of benzoyl-chloride, campholic or fencholic acid chloride may just as well be used, and in place of dimethylamine, piperidine may be employed.

*Example 6*

46 parts of benzanilide-imide-chloride are dissolved in 200 parts by volume of benzene, 36 parts of piperidine are added and the whole is heated for 2 hours at 80° C. Thereupon the precipitated piperidine hydrochloride is filtered, the benzene evaporated and the residual phenyl-piperidyl-benzamidine distilled in a high vacuum: boiling point at 1.7 mm.=170° C.

4.8 parts of dimethyl sulphate are added to 10 parts of this amidine and the whole is heated for 4 hours at 70-80° C. The methylated compound formed is then washed with dry ether and dried in a vacuum. It dissolves well in water.

In place of the phenyl-piperidyl-benzamidine, corresponding amidines halogenated in the acid as well as in the amide radical may be used.

*Example 7*

Benzoyl-cyclohexylamine is converted, in the manner described in Example 5, with the aid of thionyl chloride, into the imide-chloride (boiling point at 1.5 mm.=125-130° C.). 23 parts of the imide-chloride are dissolved in 200 parts by volume of benzene and the solution is treated with gaseous dimethylamine at 10-20° C. until no more dimethylamine hydrochloride separates out. After filtration the benzene is distilled and the residual dimethyl-cyclohexyl-benzamidine distilled in a high vacuum; boiling point at 2 mm.=125/130° C. 10 parts of this amidine are heated with 13.5 parts of cetyl bromide for 15 hours at 130-140° C.; on cooling, the new compound is washed with petroleum ether and dried in a vacuum.

Instead of cetyl bromide the corresponding quantity of dodecyl bromide can be used.

Example 8

18 parts of palmitic acid anilide are heated in known manner with 33 parts of phosphorus pentachloride for 1 hour at 90–100° C., then the phosphorus oxychloride formed is removed by distillation in a vacuum. The α,α-dichloro-palmitic-acid-phenylimide-chloride is dissolved in 200 parts by volume of benzene and gaseous dimethylamine is blown through until no more dimethylamine-hydrochloride separates out. The benzene is then distilled and the residual α,α-dichloro - palmitic - acid - dimethylphenylamidine transformed directly into a water-soluble product: 10 parts of the amidine are heated for 24 hours with 2.8 parts of dimethyl sulphate at 70–80° C., whereby a clearly water-soluble product is formed.

Example 9

115 parts of palmitic acid orthotoluidide are heated with 80 parts of thionyl chloride at first for 12 hours at 25° C., then for 2 hours at 90–100° C., until the evolution of hydrogen chloride has stopped. The palmitic acid ortho-toluyl-imide-chloride thus formed is dissolved in dry ether, freed from traces of insoluble by-products, then the ether is evaporated and the residue dessolved in 500 parts by volume of benzene. Dimethylamine gas is blown through until no more dimethylamine hydrochloride separates out, then the whole is filtered and the benzene expelled under reduced pressure.

10 parts of the palmitic acid ortho-toluyl-dimethylamidine thus produced are heated with 3.5 parts of dimethyl sulphate for 15 hours at 70–80° C. The new compound is then washed with petroleum ether and dried in a vacuum.

Example 10

22 parts of the imide-chloride mentioned in Example 1 are dissolved in 150 parts by volume of benzene, 25 parts of unsymmetrical diethylethylenediamine are added thereto and the whole is heated for 24 hours at 70–80° C. Then the benzene is blown away with steam, the oily residue extracted with ether, the ether is expelled after drying with sodium sulphate and the amidine thus produced is distilled in a high vacuum: boiling point at 0.4 mm.=155° C.

10 parts of this amidine are heated with 9.2 parts of dodecyl bromide for 7 hours at 110–120° C., whereupon a clearly water-soluble oily product is formed which solidifies within a short time.

In place of dodecyl bromide the corresponding quantity of hexadecyl bromide or octadecyl bromide can be used. Instead of the above-mentioned imide-chloride any other that is desired may be used, for instance the imide-chloride of campholic acid-butylamide.

Example 11

23 parts of ethylbenzimide-chloride, made from ethylbenzamide by means of thionyl chloride, are dissolved in 200 parts by volume of benzene and dimethylamine gas is blown through at 10–20° C. until no more dimethylamine hydrochloride separates out. The precipitate is removed by filtration, the benzene expelled and the residue distilled under reduced pressure: boiling point at 11 mm.=110–111° C.

15.4 parts of dodecyl bromide are added to 10 parts of the dimethylethyl-benzamidine thus produced and the whole is heated for a few hours at 110–120° C., whereupon a clearly water-soluble product is formed.

Example 12

23 parts of ethylbenzimide-chloride are dissolved in 200 parts by volume of benzene, 24 parts of piperidine are added and the whole is heated for 2 hours at 70–80° C. Then the precipitated piperidine hydrochloride is filtered, the solvent is expelled and the ethylpiperidyl-benzamidine distilled in a high vacuum: boiling point at 1.5 mm.=121° C.

12.5 parts of dodecyl bromide are added to 10 parts of this amidine and the mixture is heated for 12 hours at 110–120° C., whereupon a clearly water-soluble compound is formed.

In place of dodecyl bromide the corresponding quantity of hexadecyl or octadecyl bromide, or of chloromethyl-dodecyl ether may be used.

Example 13

Benzenyldiphenyl-amidine, made by melting aniline-hydrochloride with thiobenzanilide, is dissolved in an excess of benzene and stirred with the calculated quantity of dimethyl sulphate at 70–80° C. until the new water-soluble compound separates out.

What we claim is:

1. A process for the production of water-soluble amidines of the class consisting of alkylated and aralkylated amidines, comprising reacting one of the group consisting of alkylating and aralkylating agents with an amidine of the formula

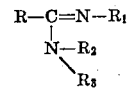

wherein R means one of the group consisting of aliphatic, araliphatic, aromatic and hydroaromatic radicals, $R_1$ means one of the group consisting of aliphatic, araliphatic, aromatic, hydroaromatic and heterocyclic radicals, $R_2$ and $R_3$ being members of the group consisting of hydrogen, aliphatic, araliphatic, aromatic and hydroaromatic radicals, whereby the reaction components are subjected to the condition that at least one aliphatic radical with at least 8 carbon atoms must be present.

2. A process for the production of water-soluble amidines of the class consisting of alkylated and aralkylated amidines, comprising reacting one of the group consisting of alkylating and aralkylating agents with an amidine of the formula

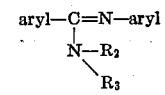

wherein aryl means radicals of the benzene series, $R_2$ and $R_3$ being members of the group consisting of hydrogen, aliphatic, araliphatic, aromatic and hydroaromatic radicals, whereby the reaction components are subjected to the condition that at least one aliphatic radical with at least 8 carbon atoms must be present.

3. A process for the production of water-soluble amidines of the class consisting of alkylated and aralkylated amidines, comprising reacting one of the group consisting of alkylating and aralkylating agents with an amidine of the formula

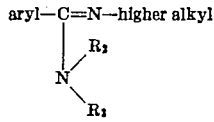

wherein aryl means a radical of the benzene series, higher alkyl means a radical with at least 8 carbon atoms, $R_2$ and $R_3$ being members of the group consisting of hydrogen, aliphatic, araliphatic, aromatic and hydroaromatic radicals.

4. A process for the production of water-soluble, alkylated amidines, comprising reacting an alkyl-halide with more than 8 carbon atoms with a dialkylphenylbenzamidine.

5. A process for the production of a water-soluble alkylated amidine, comprising reacting dodecyl bromide with dimethylphenylbenzamidine.

6. A process for the production of a water-soluble alkylated amidine, comprising reacting dimethyl sulphate with dimethyl-dodecyl-benzamidine of the formula

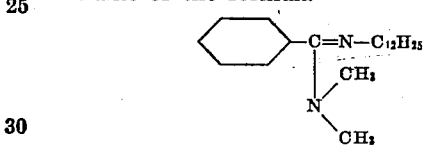

7. A process for the production of a water-soluble alkylated amidine, comprising reacting dodecyl bromide with diethylethylene-diamine-phenyl-benzamidine of the formula

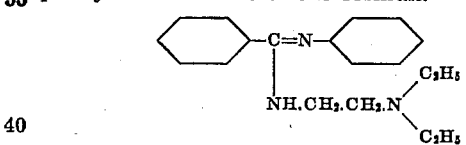

8. The amidines of the class consisting of the water-soluble alkylated and aralkylated amidines from the interaction of an amidine corresponding to the following formula:

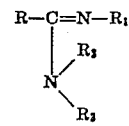

wherein R means one of the group consisting of aliphatic, araliphatic, aromatic and hydroaromatic radicals, $R_1$ means one of the group consisting of aliphatic, araliphatic, aromatic, hydroaromatic and heterocyclic radicals, $R_2$ and $R_3$ being members of the group consisting of hydrogen, aliphatic, araliphatic, aromatic and hydroaromatic radicals, with one of the group consisting of alkylating and aralkylating agents, whereby at least one aliphatic radical with at least 8 carbon atoms must be present, said amidines being valuable fungicidal and bactericidal compounds and assistants for the textile and related industries.

9. Water-soluble alkylated amidines from the interaction of an alkyl-halide with at least 8 carbon atoms and an alkyl-phenyl-benzamidine.

10. The water-soluble alkylated amidine from the addition of dodecyl bromide to dimethylphenylbenzamidine, possessing valuable fungicidal and bactericidal properties.

11. The water-soluble alkylated amidine from the addition of dimethyl sulphate to dimethyl-dodecyl-benzamidine, possessing valuable fungicidal and bactericidal properties.

12. The water-soluble alkylated amidine from the addition of dodecylbromide to diethylethylene - diamine - phenyl - benzamidine, possessing valuable fungicidal and bactericidal properties.

HENRY MARTIN.
HANS HEINRICH ZAESLIN.